United States Patent
Jang et al.

(10) Patent No.: US 8,473,297 B2
(45) Date of Patent: Jun. 25, 2013

(54) MOBILE TERMINAL

(75) Inventors: Seok Bok Jang, Seoul (KR); Joon Yup Lee, Seoul (KR); Jong Se Park, Seoul (KR); Jae Min Kim, Seoul (KR); Yong Chul Park, Seoul (KR); Jung Kyu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 12/874,345

(22) Filed: Sep. 2, 2010

(65) Prior Publication Data

US 2011/0119572 A1 May 19, 2011

(30) Foreign Application Priority Data

Nov. 17, 2009 (KR) .................. 10-2009-0111091

(51) Int. Cl.
*G10L 13/00* (2006.01)
*G10L 13/08* (2006.01)

(52) U.S. Cl.
USPC ............................ 704/260; 715/205; 704/235

(58) Field of Classification Search
USPC ....................................................... 715/205
See application file for complete search history.

(56) References Cited

U.S. PATENT DOCUMENTS

| | | | | |
|---|---|---|---|---|
| 6,708,152 B2 * | 3/2004 | Kivimaki | | 704/260 |
| 7,013,282 B2 * | 3/2006 | Schrocter | | 704/270.1 |
| 7,111,240 B2 * | 9/2006 | Crow et al. | | 715/723 |
| 7,467,349 B1 * | 12/2008 | Bryar et al. | | 715/205 |
| 2003/0219706 A1 * | 11/2003 | Nijim | | 434/317 |
| 2006/0036494 A1 * | 2/2006 | Aufricht et al. | | 705/14 |
| 2007/0277088 A1 * | 11/2007 | Bodin et al. | | 715/501.1 |
| 2008/0055264 A1 | 3/2008 | Anzures et al. | | |
| 2009/0048821 A1 * | 2/2009 | Yam et al. | | 704/3 |
| 2009/0199085 A1 * | 8/2009 | Park | | 715/234 |
| 2009/0254345 A1 * | 10/2009 | Fleizach et al. | | 704/260 |
| 2009/0298529 A1 * | 12/2009 | Mahajan | | 455/550.1 |
| 2009/0313020 A1 * | 12/2009 | Koivunen | | 704/260 |
| 2010/0105364 A1 * | 4/2010 | Yang | | 455/414.1 |
| 2010/0153114 A1 * | 6/2010 | Shih et al. | | 704/260 |

FOREIGN PATENT DOCUMENTS

WO   WO 01/79986 A2   10/2001

OTHER PUBLICATIONS

Motiwalla, Luvai, "Speech-Enabled Mobile Learning Application", IEEE, 2005, pp. 1-8.*
Fabbrizio et al. "A Speech Mashup Framework for Multimodal Mobile Service", ACM, 2009, pp. 71-78.*
European Search Report dated Mar. 3, 2011 for Application No. 10007396.4, 7 pages.

* cited by examiner

*Primary Examiner* — James Debrow
(74) *Attorney, Agent, or Firm* — Fich & Richardson P.C.

(57) ABSTRACT

A mobile terminal outputs text-to-speech (TTS) voice data. The mobile terminal displays text data including link data on a display unit of the mobile terminal, selects the link data, receives an original data of the link data as a background process, converts the original data to the TTS voice data, and outputs the TTS voice data though a voice outputting unit of the mobile terminal.

15 Claims, 13 Drawing Sheets

MOBILE TERMINAL

CROSS-REFERENCE TO RELATED APPLICATIONS

This present application claims the benefit of priority to Korean Application No. 10-2009-0111091, filed on Nov. 17, 2009, which is hereby incorporated by reference as if fully set forth herein.

FIELD

The present disclosure relates to a method for processing voice data in a mobile terminal.

BACKGROUND

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like.

To support and increase the terminal functions, the improvement of structural parts and/or software parts of the terminal may be considered.

Recently, the interne web page or the E-book data may be displayed on the mobile terminal.

SUMMARY

In one aspect, a method of outputting electronic content includes displaying, using a mobile terminal, an electronic interface that includes text data and a link to electronic content. The link defines an address at which the electronic content is accessible. The method also includes receiving user input selecting the link to electronic content included in the displayed electronic interface and, in response to receiving the user input selecting the link, accessing the electronic content linked to by the selected link using the address defined by the link. The method further includes processing the accessed electronic content linked to by the selected link to identify text data included in the accessed electronic content, converting the identified text data into an audio signal, and outputting the audio signal using a speaker device without displaying the electronic content on the mobile terminal in response to receiving the user input selecting the link.

Implementations may include one or more of the following features. For example, the method may include displaying a first web page that includes text data and a link to a second web page. The link may define an address at which the second web page is accessible. In this example, the method also may include accessing the second web page using the address at which the second web page is accessible and extracting text data from the second web page. Further, in this example, the method may include converting the extracted text data from the second web page into the audio signal and outputting the audio signal using the speaker device without displaying the second web page on the mobile terminal in response to receiving the user input selecting the link.

In addition, the method may include maintaining display of the first web page on the mobile terminal while outputting the audio signal. The method also may include receiving user input navigating to a third web page while outputting the audio signal and displaying the third web page on the mobile terminal while continuing to output the audio signal. The third web page may be different than the first web page and the second web page. The method further may include receiving user input to return to the electronic interface having the link to the second web page and, in response to receiving the user input to return to the electronic interface having the link to the second web page, shifting the display to show the first web page that includes text data and the link to the second web page.

In some implementations, the method may include, in response to receiving the user input selecting the link, determining whether the mobile terminal is set in a text-to-speech (TTS) conversion mode. In these implementations, the processing, converting, and outputting may occur automatically, without further human intervention, in response to a determination that the mobile terminal is set in the TTS conversion mode. In addition, in these implementations, the method may include, in response to a determination that the mobile terminal is not set in the TTS conversion mode, displaying an interface element that enables a user select among options including at least displaying the electronic content linked to by the selected link and outputting the electronic content linked to by the selected link as audio output. The processing, converting, and outputting may be conditioned on receiving, using the displayed interface element, a selection of the option to output the electronic content linked to by the selected link as audio output.

In some examples, the method may include displaying a progress bar that shows progress of outputting the audio signal. In these examples, the method may include determining an amount of the electronic content that has been audibly output relative to a total amount of the electronic content, determining a time needed to audibly output a remainder of the electronic content that has not been audibly output, and displaying a progress bar that indicates the determined amount of the electronic content that has been audibly output relative to the total amount of the electronic content and the determined time needed to audibly output the remainder of the electronic content that has not been audibly output.

The method may include enabling a user to rewind, fast forward, pause, and play the audio signal. In addition, the method may include displaying an electronic interface that includes text data and a plurality of links to electronic content. Each of the plurality of links may define an address at which electronic content of the corresponding link is accessible. The method also may include receiving user input selecting the plurality of links and outputting an audio signal of electronic content for each of the plurality of links in an order in which the plurality of links were selected. Further, the method may include displaying tabs corresponding to the plurality of links, wherein each tab is selectable to cause electronic content of the corresponding link to be audibly output.

In some implementations, the method may include determining whether a still image is included in the electronic content linked to by the selected link and, in response to a determination that a still image is included in the electronic content linked to by the selected link, displaying, while outputting the audio signal, a still image control that is selectable to cause display of the still image. In response to receiving user input selecting the still image control, the still image may be displayed and outputting of the audio signal may be continued.

The method may include determining whether a moving image is included in the electronic content linked to by the selected link and, in response to a determination that a moving image is included in the electronic content linked to by the selected link, displaying, while outputting the audio signal, a moving image control that is selectable to cause display of the moving image. In response to receiving user input selecting the moving image control, the moving image may be displayed.

The method also may include displaying, while outputting the audio signal, an entrance control that is selectable to cause display of the electronic content linked to by the selected link. In response to receiving user input selecting the entrance control, the electronic content linked to by the selected link may be displayed and outputting of the audio signal may be continued.

In some examples, the method may include receiving user input selecting a subset of the text data displayed in the electronic interface, converting the subset of the text data into a second audio signal in response to the user input selecting the subset of the text data displayed in the electronic interface, and outputting the second audio signal using the speaker device. In these example, the method may include determining a selection speed with which the subset of the text data was selected and adjusting a speed of outputting the second audio signal based on the determined selection speed.

In some implementations, the method may include displaying an electronic mail interface that includes a link to an electronic mail message. The link may define an address at which content of the electronic mail message is accessible. In these implementations, the method may include accessing the content of the electronic mail message, extracting text data from the content of the electronic mail message, converting the extracted text data from the content of the electronic mail message into the audio signal, and outputting the audio signal using the speaker device without displaying the content of the electronic mail message on the mobile terminal in response to receiving the user input selecting the link.

In another aspect, a mobile terminal includes at least one processor and at least one computer-readable medium coupled to the at least one processor having instructions stored thereon which, when executed by the at least one processor, causes the at least one processor to perform operations. The operations include displaying an electronic interface that includes text data and a link to electronic content. The link defines an address at which the electronic content is accessible. The operations also include receiving user input selecting the link to electronic content included in the displayed electronic interface and, in response to receiving the user input selecting the link, accessing the electronic content linked to by the selected link using the address defined by the link. The operations further include processing the accessed electronic content linked to by the selected link to identify text data included in the accessed electronic content, converting the identified text data into an audio signal, and outputting the audio signal using a speaker device without displaying the electronic content on the mobile terminal in response to receiving the user input selecting the link.

In yet another aspect, at least one computer-readable storage medium is encoded with at least one computer program comprising instructions that, when executed, operate to cause a computer to perform operations. The operations include displaying an electronic interface that includes text data and a link to electronic content. The link defines an address at which the electronic content is accessible. The operations also include receiving user input selecting the link to electronic content included in the displayed electronic interface and, in response to receiving the user input selecting the link, accessing the electronic content linked to by the selected link using the address defined by the link. The operations further include processing the accessed electronic content linked to by the selected link to identify text data included in the accessed electronic content, converting the identified text data into an audio signal, and outputting the audio signal using a speaker device without displaying the electronic content on the mobile terminal in response to receiving the user input selecting the link.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Implementations of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
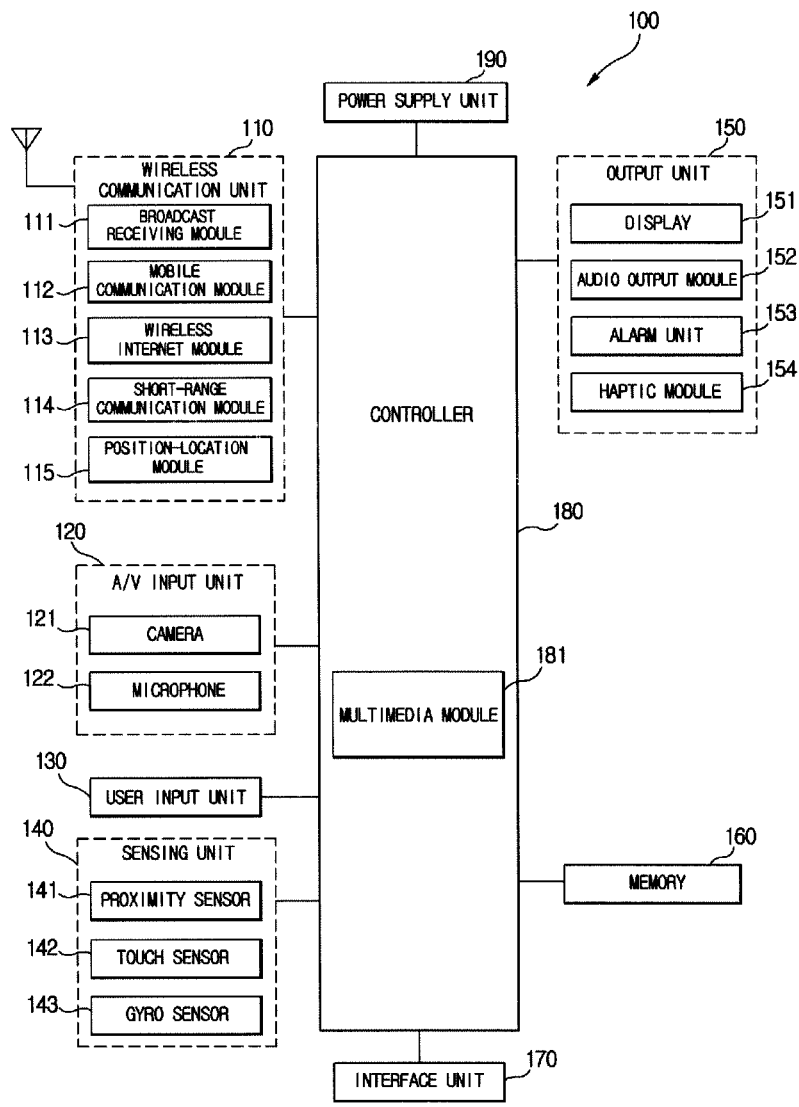
FIG. 1 is a block diagram of an example mobile terminal.

FIG. 1 shows an example mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). Reception of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a changed position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a touch sensor 142, and a gyro sensor 143.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or in a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through an area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutually-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or absence of an object approaching a prescribed detecting surface or an object existing around the proximity sensor 141 using an electromagnetic field strength or infrared ray without mechanical contact. The proximity sensor 141 may have a longer durability than that of the contact type sensor and may also have a greater usage than that of the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified as the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be a position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by stimuli such as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and the power in turn may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or a card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereinafter an identity device) may be manufactured in the form of a smart card. The identity device may be connected to the mobile terminal 100 via a port.

The interface unit 170 may function as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separately from the controller 180.

The multimedia module may have a function of TTS (Text to Speech) to convert a text data to a voice data.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Implementations of the present disclosure explained in the following description may be implemented within a recording medium that can be read by a computer or a computer-like device using software, hardware or combination thereof.

According to the hardware implementation, arrangements may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, implementations may be implemented by the controller 180.

For a software implementation, arrangements and examples described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
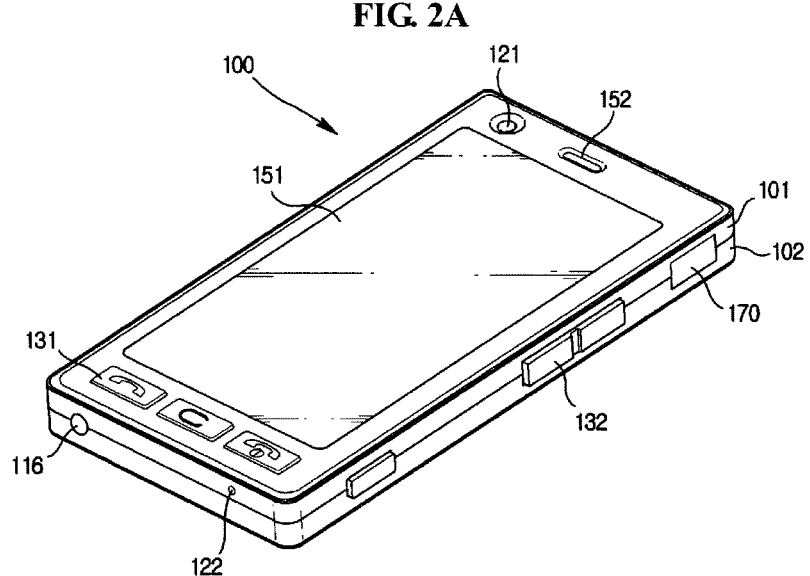
FIG. 2A is a front-view of an example mobile terminal.

FIG. 2A illustrates an example mobile terminal. As shown in FIG. 2A, the mobile terminal 100 may include a bar type terminal body. Implementations of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism in a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for switching to a touch recognizing mode of the display 151 or the like may be inputted to the second manipulating unit 132.

Figure 2B:
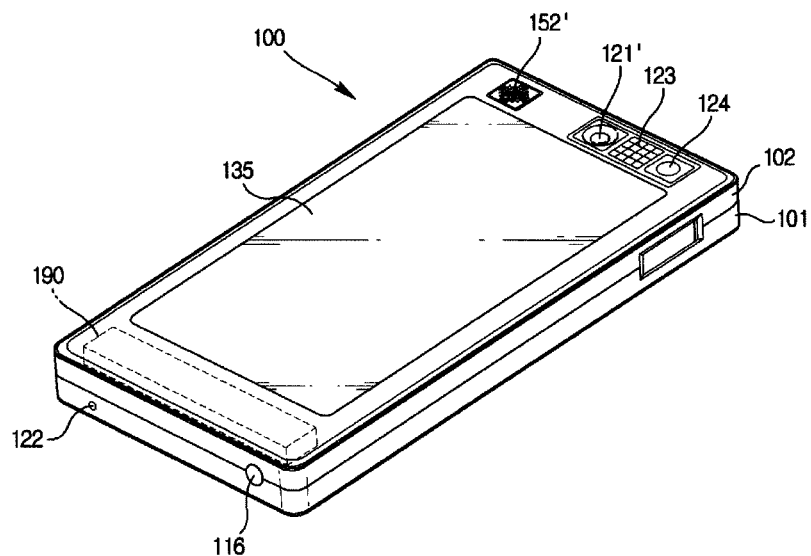
FIG. 2B is a diagram of a backside of the mobile terminal shown in FIG. 2A.

FIG. 2B illustrates another example mobile terminal. As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from those of the camera 121.

For example, the camera 121 may have a lower number of pixels to capture and transmit a picture of user face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered as a portion of the broadcast receiving module 111 shown in FIG. 1 and may be retractably provided on the terminal body.

The power supply 190 for supplying a power to the mobile terminal 100 may be provided to the terminal body. The power supply 190 may be embedded within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may also recognize visual information via the touchpad 135. The information outputted from both of the faces may be controlled by the touchpad 135. Alternatively, a display may be further provided to the touchpad 135 so that a touchscreen can be also provided to the rear case 102.

The touchpad 135 may be activated by interconnecting with the display 151 of the front case 101. The touchpad 135 may be provided in rear of the display 151 in parallel to one another. The touchpad 135 may have a size equal to or smaller than that of the display 151.

In the following description, a method for outputting content in the mobile terminal will be described, referring to FIGS. 3 and 4.

Figure 3:
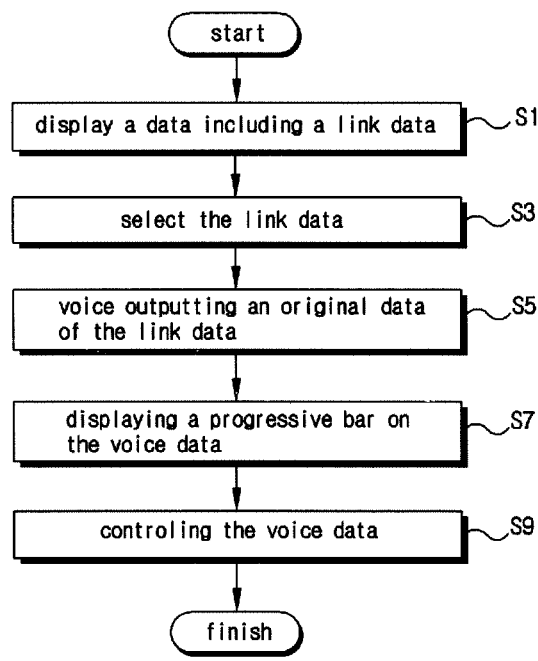
FIG. 3 is a flow chart of an example process for outputting data in a mobile terminal.

As shown in FIG. 3, at first, the user may use a user input unit 130 to display a data which is stored in a memory 160 or received from a wireless communication module 110 (S1). At this point, the data includes a link data. Here, the link data is defined as a data for connecting an original data. The link data may define an address at which the electronic content is accessible from electronic storage or from a network device. In case of web page data, the link data is a data for connecting other web page. In some examples, the data may be any one of the web page data and the e-book data. The original data may include a title data of an image data and a characteristic data of the image data. Namely, the original data may include text data information which may be converted to a voice data. When the user selects the link data by using the user input unit 130 (S3), the controller receives the original data of the selected link data for conversion to the TTS voice data. For instance, the controller uses the address defined by the link data to access electronic content linked to by the link data. The controller 180 outputs the TTS voice data through the voice outputting module (S5). Namely, the original data (e.g., accessed electronic content) representing with the link data is outputted through the voice outputting module by using the TTS function in a state that the original data is not displayed on the display unit 151. The voice outputting module may be located in the controller 180. In some implementations, a progressive bar for the voice of the original data may be displayed on the display unit 151 (S7). The progressive bar may include a control menu for controlling a voice output, an image icon representing an image included in the original data, and an entrance icon for entering the original data (S9).

While the voice is outputted, the user may read the text data which has been displayed on the display unit 151. Namely, the user may read the data which is currently displayed on the display unit 151 and recognize the linked data (original data) by TTS function. At this point, the shift of the display may occur when user reads the text data. In this case that the state of the display in the display unit is changed, the user may use a separate hot key to return to a portion where the selected linked data is displayed. Also, re-inputting of the hot key may make the display changed to the portion which the user has seen.

According to the above implementation of the present disclosure, the user may output the original data represented by the link data with no screen changed.

Figure 4:
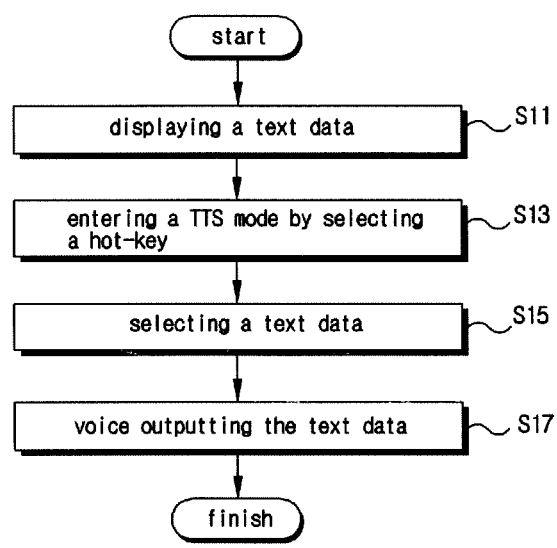
FIG. 4 is a flow chart of an example process for outputting data in a mobile terminal.

FIG. 4 illustrates an example process for outputting content in a mobile terminal. At first, data including text data may be displayed on the touch screen of a display unit 151 (S11). If a hot key is selected in a state that the data is displayed on the touch screen, the mobile terminal 100 enters into the TTS mode (S13). The TTS mode icon informing that the mobile terminal 100 enters into the TTS mode may be displayed on the display unit. If at least a portion of the text data is selected, the selected text data is voice-outputted through the voice outputting module (S15, S17). Here, the data may include any one of the web page data and the e-book data. Moreover, the text data may be selected by a flicking signal. The portion where the flicking signal is generated may be selected. Moreover, if the user touches and drags the data by holding the hot key, the controller controls the voice outputting module to output the voice according to the drag of the text data.

In this implementation, a TTS voice function may be executed by a simple gesture. Furthermore, in case that it is difficult to read the text data due to the small display unit of the mobile terminal, the user may recognize the displayed text data by outputting the voice data.

In the following description, the operation of the mobile terminal applied with the method for outputting a TTS voice data in a mobile terminal will be described, referring to FIGS. 5 and 6.

Figure 5A:
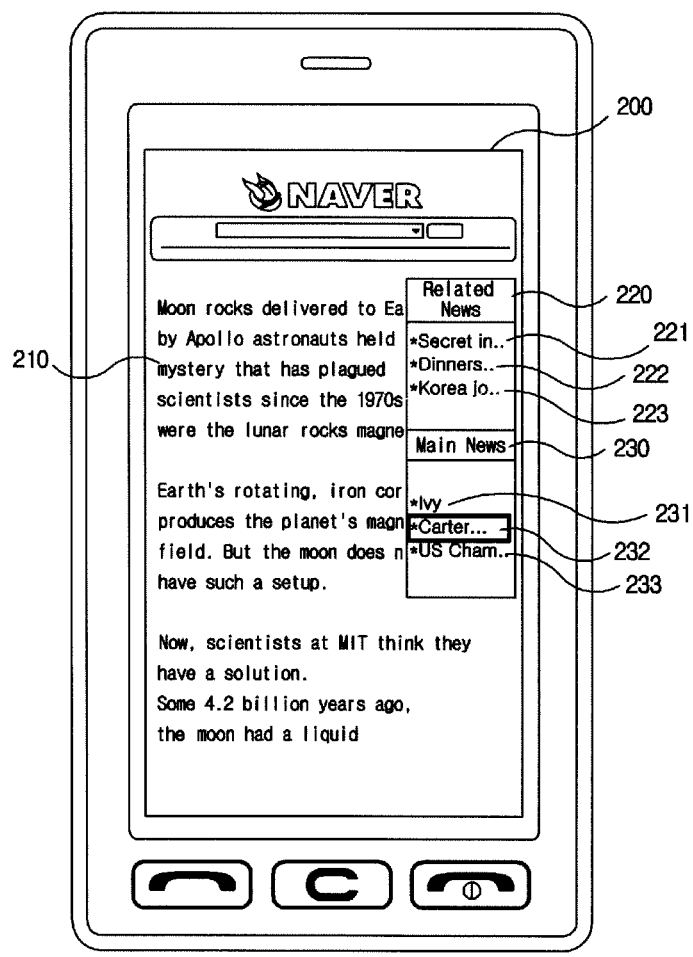
FIGS. 5A–5F are example image diagrams.

Referring to FIG. 5A, a web page is displayed on a display unit 200. In this implementation, the web page is only one example. The e-book data, messaging data (e.g., electronic mail data), calendar data, and the document data and so on can be output.

As shown in FIG. 5A, the web page screen 200 includes an article block 210, a related news block 220 and a main news block 230. The related news block 220 includes a plurality of the related news link data 221-223. The main news block 230 includes a plurality of the main news link data 231-233. The link data represents an original data (e.g., content made accessible at an address specified by the link). The link data includes at least a portion of the title of the original data.

Figure 5B:
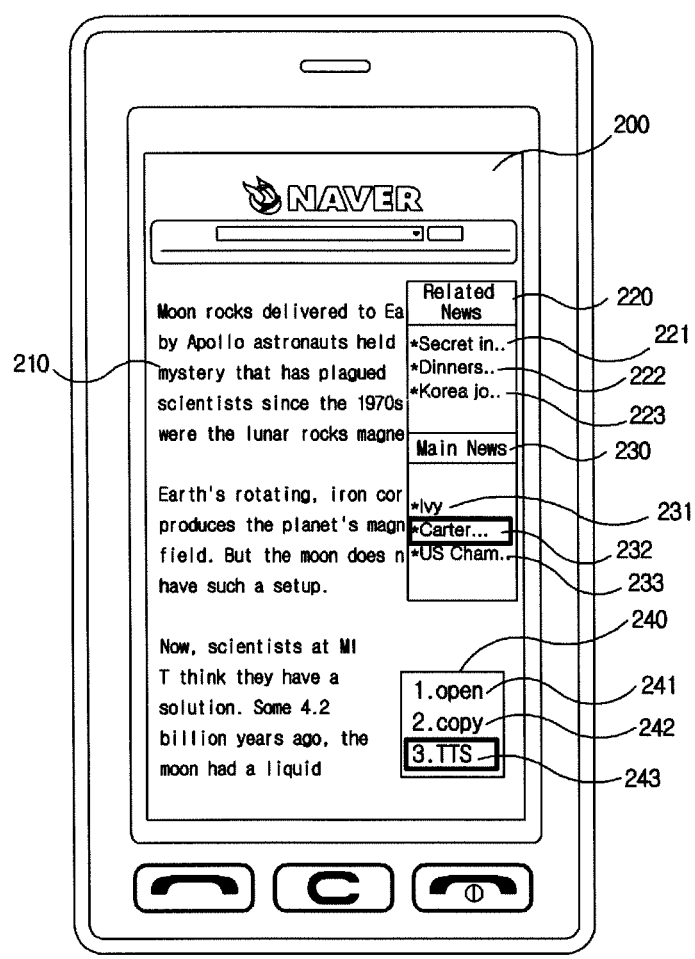

In a state that the web page data including the link data is displayed on the display unit 151, for example, if one 232 of the link data 221-223, 231-233 is selected, as shown in FIG. 5B, a link data menu window 240 is displayed on the display unit 151. The link menu window 240 may include an open item 241, a copy item 242 and a TTS item 243.

If the open item 241 is selected, the controller 180 controls the wireless communication unit 110 to enter into the web page data of the original data to display and store the original data of the link data 232 in the memory 160.

If the copy item 242 is selected, the controller 180 controls the wireless communication unit 110 to receive and store the original data of the link data 232 in memory 160.

Figure 5C:
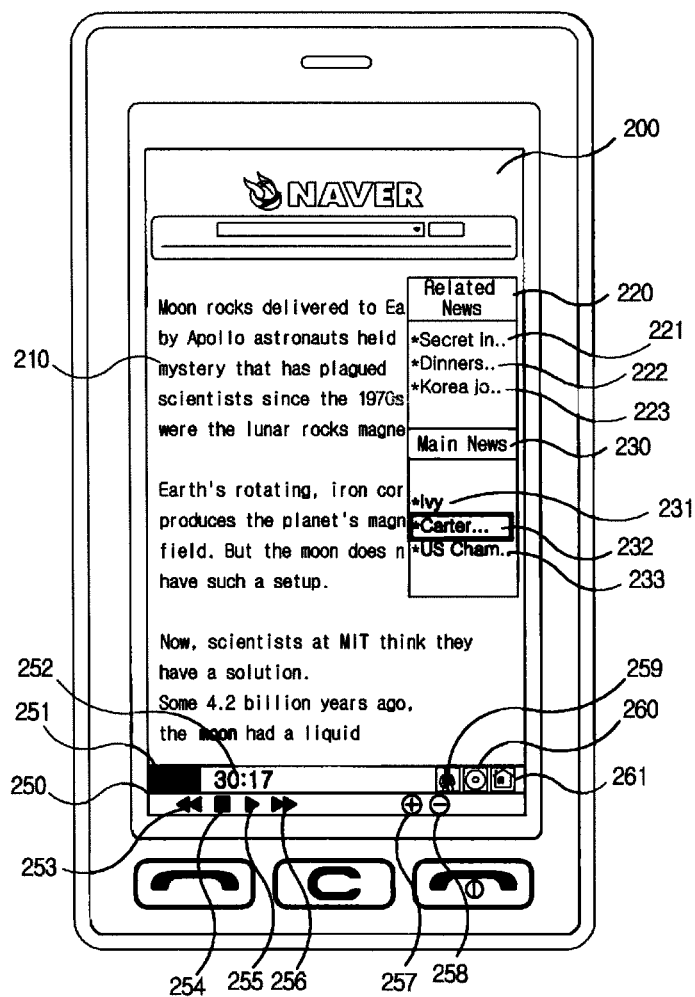

If the TTS item 243 is selected, the controller controls the wireless communication unit 110 to receive and store the original data of the link data 232 and to execute a TTS function to output a voice data. At this time, as shown in FIG. 5C, the progressive bar 250 may be displayed on the display unit 151. Referring to FIG. 5C, the progressive bar 250 may include a control menu 251-258 for controlling the voice output, a still image icon 259 representing a still image included in the original data, a moving image icon 260 representing a moving image included in the original data and an entrance icon 261 for entering the original data.

The control menu for controlling the voice output may include a scroll box 251 displaying a current output portion in the total voice data, a time icon 252 displaying the time of the remaining voice data, a rewind icon 253, a stop icon 254, a fast forward icon 256, a volume up icon 257, and a volume down icon 258. Moreover, if a still image is included in the original data, the still image icon 259 is additionally displayed. If a moving image (e.g., video) is included in the original data, the moving image icon 260 is additionally displayed. If the image icon 259, 260 is selected, the image (e.g., still image or moving image) is displayed on the display unit 151. On the other hand, if the entrance icon 261 is selected, the original data of the link data comes to be displayed on the display unit 151.

Figure 5D:
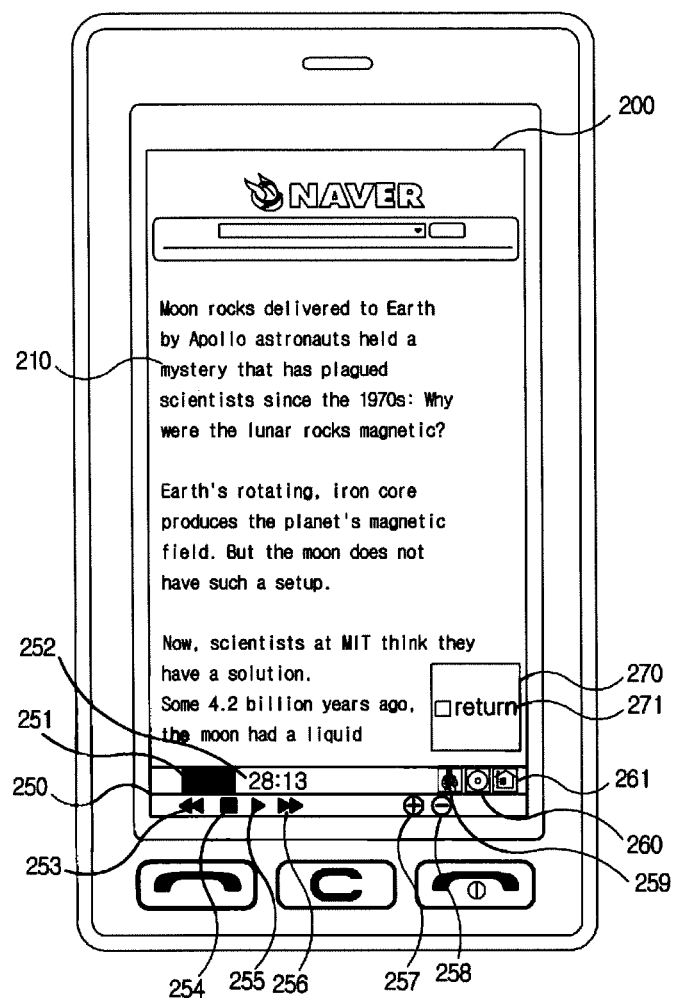
Figure 5E:
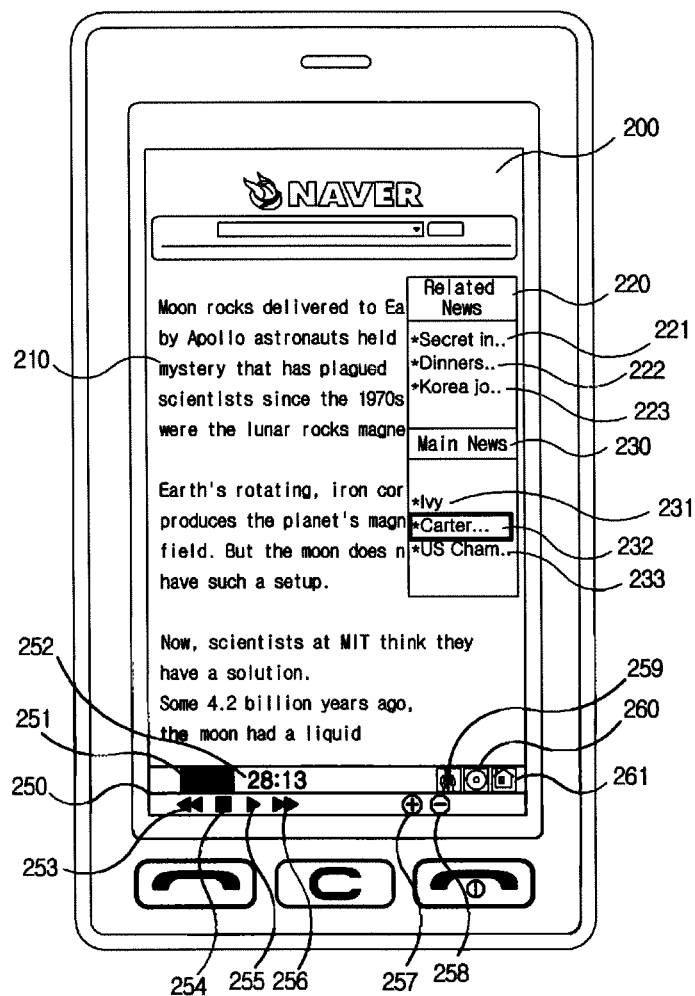

In some examples, while the original data of the link data 232 is voice-outputted by the TTS function, the web page screen 200 remains to be displayed on the display unit 151. The user may read the text data of the web page by shifting the screen by means of the pointing device or a navigation key. FIG. 5D illustrates a state of a screen 270 after the screen shift. In this state, if the user generates a double click signal on the margin of the web page, the return icon 271 is displayed. Here, if the return icon 271 is selected, as shown in FIG. 5E, the screen shift is automatically made to display a portion where the link data 232 is displayed on the display unit 151. If the any one of the link data 221-223 is selected again, to voice-output the original data of the selected link data and the return icon 271 is selected again, the previous screen which the user has seen is displayed on the display unit as shown in FIG. 5D. This returning input may be replaced by the double click or the long touch on the margin of the web page.

Figure 5F:
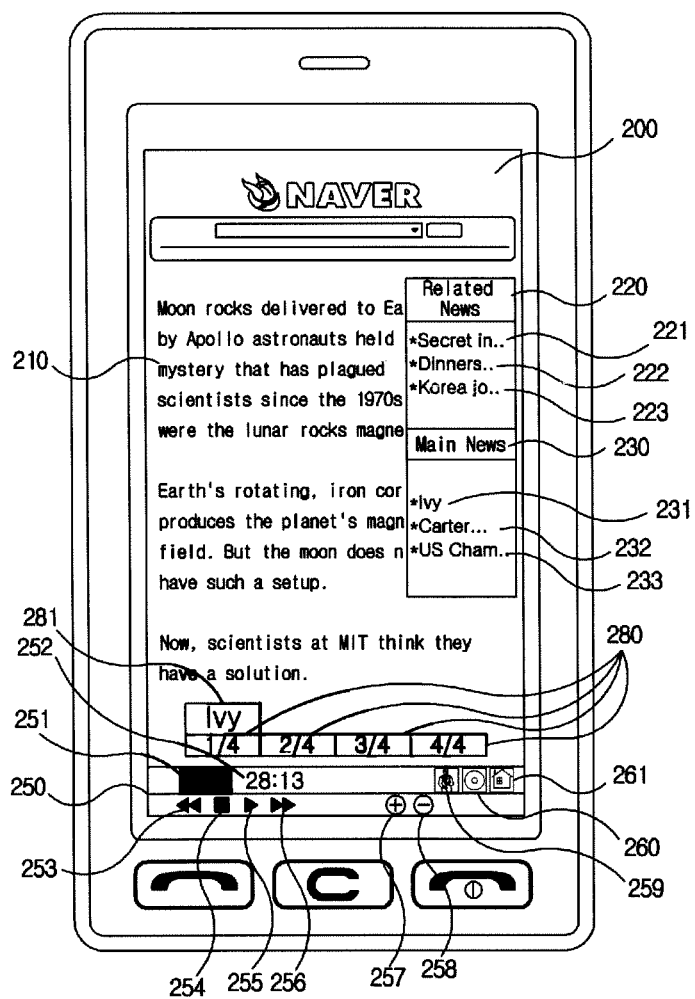

FIG. 5F illustrates an example where the selected plurality of the link data is voice outputted as the voice data. As shown, in case of selecting the plurality of the link data, tabs 280 representing the original data of the link data are displayed on the progressive bar. If the user selects the any one of the tabs 280, the selected original data is voice-outputted through the voice output module. The respective tabs may include title information of the original data. Voice data may be outputted for each of the selected plurality of the link data in an order in which the link data was selected. For example, a user may select a plurality news links that each link to a particular news article. In this example, the mobile terminal may output voice data for each of the plurality news links without further user input, so that the user may listen to all of the selected news articles in order. In this regard, the user may select the plurality news links prior to beginning an activity in which the user is unable to easily interact with the mobile terminal (e.g., driving in a car, going on a jog for exercise, etc.) and the mobile terminal will provide audible output of the selected news links so that the user can listen to the news articles in order while performing the activity.

If the user generates a preliminary signal on the each tab, the controller may display a pop-up window 281 of the selected tab and the title information of the original data may be displayed on the pop-up window 281.

Figure 6A:
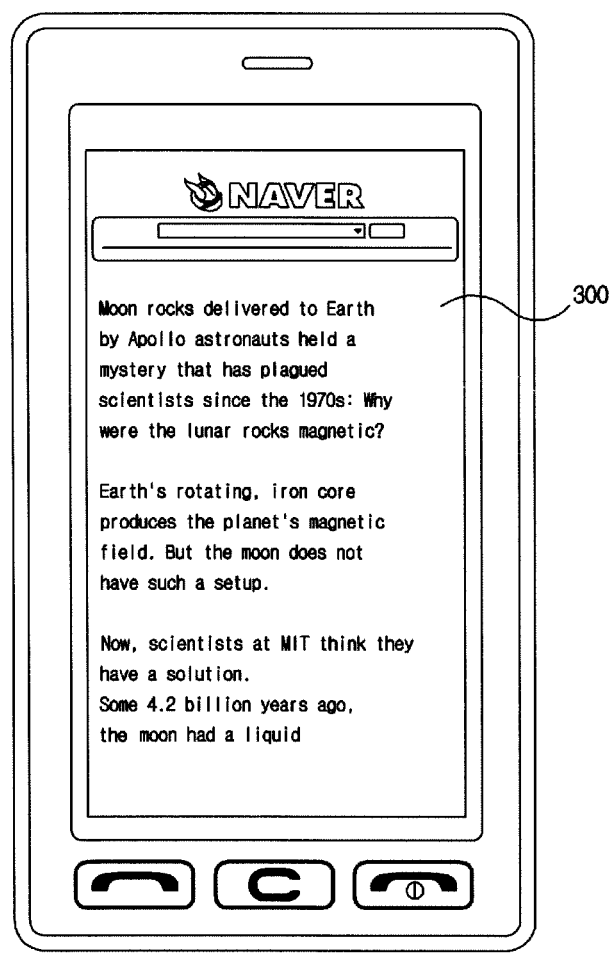
FIGS. 6A–6C are other example image diagrams.

FIG. 6 is an example image diagram of a mobile terminal where the method for outputting data is applied, according to the present disclosure. FIG. 6A illustrates a web page screen 300. In this implementation, the web page is only one example. The e-book data, messaging data (e.g., electronic mail data), calendar data, and the document data and so on may be applied.

Figure 6B:
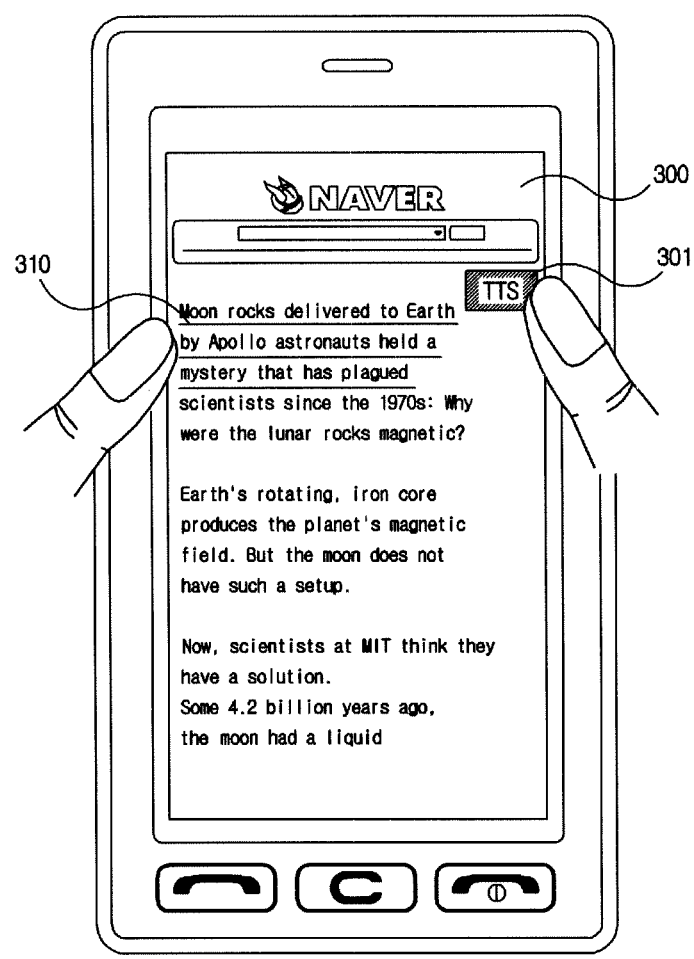

As shown in FIG. 6B, if the user selects a TTS hot key 301 in a state that the web page screen 300 is displayed, a TTS icon 301 is displayed on the touch screen. In a state that the TTS icon is held, if the user touches and drags over text data, the text data is voice-outputted through the voice outputting module. Namely, the speed of the voice data is determined by the speed of the drag gesture. In this implementation, after the hot key is selected, the TTS function is executed on the text data in a state that the TTS icon is held. However, it is not limited to this example. If the long touch input is made, the TTS mode automatically is entered. Then, if the drag gesture is made in the TTS mode, the selected text is voice-outputted by the TTS function. Alternatively, if user clicks the TTS icon two times, the second click acts as the link data, thereby all text data corresponding to a web page or a document are processed and outputted through the voice outputting module.

Moreover, even if it is not shown in the figure, entrance of the TTS mode is made by using the menu tree. If the touch and drag gesture is made on the text data after entering into the TTS mode, the TTS voice output is made by the drag gesture.

Figure 6C:
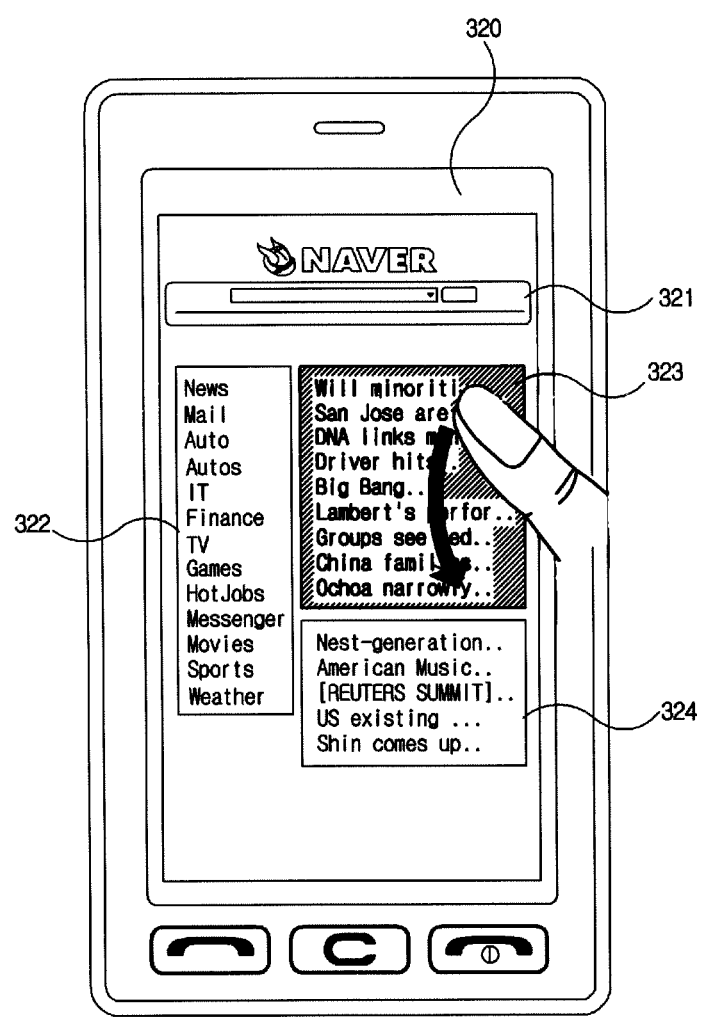

FIG. 6C illustrates an example where the text data included in the web page block is selected by a flicking gesture. As shown in FIG. 6C, the web page comprises a plurality of the web page blocks 321-324. If the user generates the flicking signal on one 323 of the web page blocks, the entire data in the block is selected to execute the TTS function. Here, in a case that the image data exists, the title information of the image data may be voice-outputted.

In some implementations, the text data may include email (or other messaging) data. If user enters an email display mode, the web page display 320 displays a list of received emails (e.g., titles of received emails). Then, if the user selects one or more titles, then selected email or emails may execute the TTS function and output corresponding voice through voice outputting module. Further, if a user opens an email and, if the user touches and drags the text email data, the text data is voice-outputted through the voice outputting module.

In addition, when the email (or other messaging) data includes an attachment, the TTS function may provide voice output of text included in the attachment. For instance, the attachment may be a word processing document and the TTS function may provide voice output of text included in the word processing document. The mobile terminal may automatically output the attachment data using the TTS function when an email message is selected or may output the attachment data using the TTS function when a user selects an attachment icon that links to the attachment.

In some implementations, a user can navigate to other pages or perform other functions of the mobile terminal while TTS audio is being output for a selected link (e.g., a selected web page). For instance, a user can read email or review a calendar when listening to web page audio using the TTS function. Various user input mechanisms can be used to jump between different audio outputs and different mobile terminal applications.

In some examples, the mobile terminal may receive a telephone call or make a phone call while text data is being voice-outputted. In these examples, the mobile terminal may detect the telephone call and automatically mute the sound outputted through the voice outputting module or pause execution of the TTS function. Then, as soon as the telephone call is finished, the mobile terminal may detect completion of the telephone call and automatically reactivate outputting the sound or execution the TTS function. Alternatively, the mobile terminal may display an icon asking whether the user wishes to resume listening to the voice output of the text data. If the user clicks the icon, the mobile terminal may resume execution of the TTS function.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that implementations of the present disclosure may cover the modifications and variations of this disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of outputting electronic content, the method comprising:
displaying, using a mobile terminal, an electronic interface that includes text data and a link to electronic content, the link defining an address at which the electronic content is accessible;
receiving first user input selecting the link to electronic content included in the displayed electronic interface;
in response to receiving the first user input selecting the link, displaying a window including a text-to-speech (TTS) item;
receiving second user input selecting the TTS item;
in response to receiving the second user input selecting the TTS item, accessing the electronic content linked to by the selected link using the address defined by the link;
processing the accessed electronic content linked to by the selected link to identify text data included in the accessed electronic content;
converting the identified text data into an audio signal;
outputting the audio signal using a speaker device without displaying the electronic content on the mobile terminal in response to receiving the first user input selecting the link; and
displaying a progress bar indicating output position of the audio signal, wherein the progress bar includes a menu for controlling output of the audio signal, a first icon for displaying the electronic content linked to by the selected link, a second icon representing a still image included in the electronic content linked to by the selected link, and a third icon representing a moving image included in the electronic content linked to by the selected link.

2. The method of claim 1:
wherein displaying the electronic interface comprises displaying a first web page that includes text data and a link to a second web page, the link defining an address at which the second web page is accessible;
wherein accessing the electronic content linked to by the selected link using the address defined by the link comprises accessing the second web page using the address at which the second web page is accessible;
wherein processing the accessed electronic content linked to by the selected link to identify text data included in the accessed electronic content comprises extracting text data from the second web page;
wherein converting the identified text data into the audio signal comprises converting the extracted text data from the second web page into the audio signal; and
wherein outputting the audio signal using the speaker device comprises outputting the audio signal using the speaker device without displaying the second web page on the mobile terminal in response to receiving the user input selecting the link.

3. The method of claim 2 further comprising:
maintaining display of the first web page on the mobile terminal while outputting the audio signal.

4. The method of 2 further comprising:
receiving user input navigating to a third web page while outputting the audio signal, the third web page being different than the first web page and the second web page; and
displaying the third web page on the mobile terminal while continuing to output the audio signal.

5. The method of claim 4 further comprising:
receiving user input to return to the electronic interface having the link to the second web page; and
in response to receiving the user input to return to the electronic interface having the link to the second web page, shifting the electronic interface to show the first web page that includes text data and the link to the second web page.

6. A mobile terminal comprising:
at least one processor; and
at least one computer-readable medium coupled to the at least one processor having instructions stored thereon which, when executed by the at least one processor, causes the at least one processor to perform operations comprising:
displaying an electronic interface that includes text data and a link to electronic content, the link defining an address at which the electronic content is accessible;
receiving first user input selecting the link to electronic content included in the displayed electronic interface;
in response to receiving the first user input selecting the link, displaying a window including a text-to-speech (TTS) item;
receiving second user input selecting the TTS item;
in response to receiving the second user input selecting the TTS item, accessing the electronic content linked to by the selected link using the address defined by the link;
processing the accessed electronic content linked to by the selected link to identify text data included in the accessed electronic content;
converting the identified text data into an audio signal;
outputting the audio signal using a speaker device without displaying the electronic content on the mobile terminal in response to receiving the first user input selecting the link; and
displaying a progress bar indicating output position of the audio signal, wherein the progress bar includes a menu for controlling output of the audio signal, a first icon for displaying the electronic content linked to by the selected link, a second icon representing a still image included in the electronic content linked to by the selected link, and a third icon representing a moving image included in the electronic content linked to by the selected link.

7. The mobile terminal of claim 6:
wherein displaying the electronic interface comprises displaying a first web page that includes text data and a link to a second web page, the link defining an address at which the second web page is accessible;
wherein accessing the electronic content linked to by the selected link using the address defined by the link comprises accessing the second web page using the address at which the second web page is accessible;
wherein processing the accessed electronic content linked to by the selected link to identify text data included in the accessed electronic content comprises extracting text data from the second web page;
wherein converting the identified text data into the audio signal comprises converting the extracted text data from the second web page into the audio signal; and
wherein outputting the audio signal using the speaker device comprises outputting the audio signal using the speaker device without displaying the second web page on the mobile terminal in response to receiving the user input selecting the link.

8. The mobile terminal of claim 7, wherein the operations further comprise:
maintaining display of the first web page on the mobile terminal while outputting the audio signal.

9. The mobile terminal of 7, wherein the operations further comprise:
receiving user input navigating to a third web page while outputting the audio signal, the third web page being different than the first web page and the second web page; and
displaying the third web page on the mobile terminal while continuing to output the audio signal.

10. The mobile terminal of claim 9, wherein the operations further comprise:
receiving user input to return to the electronic interface having the link to the second web page; and
in response to receiving the user input to return to the electronic interface having the link to the second web page, shifting the electronic interface to show the first web page that includes text data and the link to the second web page.

11. At least one non-transitory computer-readable storage medium encoded with at least one computer program comprising instructions that, when executed, operate to cause a computer to perform operations comprising:
displaying an electronic interface that includes text data and a link to electronic content, the link defining an address at which the electronic content is accessible;
receiving first user input selecting the link to electronic content included in the displayed electronic interface;
in response to receiving the first user input selecting the link, displaying a window including a text-to-speech (TTS) item;
receiving second user input selecting the TTS item;
in response to receiving the second user input selecting the TTS item, accessing the electronic content linked to by the selected link using the address defined by the link;
processing the accessed electronic content linked to by the selected link to identify text data included in the accessed electronic content;
converting the identified text data into an audio signal;
outputting the audio signal using a speaker device without displaying the electronic content on the mobile terminal in response to receiving the first user input selecting the link; and
displaying a progress bar indicating output position of the audio signal, wherein the progress bar includes a menu for controlling output of the audio signal, a first icon for displaying the electronic content linked to by the selected link, a second icon representing a still image included in the electronic content linked to by the selected link, and a third icon representing a moving image included in the electronic content linked to by the selected link.

12. The at least one non-transitory computer-readable storage medium of claim 11:
wherein displaying the electronic interface comprises displaying a first web page that includes text data and a link to a second web page, the link defining an address at which the second web page is accessible;
wherein accessing the electronic content linked to by the selected link using the address defined by the link comprises accessing the second web page using the address at which the second web page is accessible;
wherein processing the accessed electronic content linked to by the selected link to identify text data included in the accessed electronic content comprises extracting text data from the second web page;
wherein converting the identified text data into the audio signal comprises converting the extracted text data from the second web page into the audio signal; and
wherein outputting the audio signal using the speaker device comprises outputting the audio signal using the speaker device without displaying the second web page on the mobile terminal in response to receiving the user input selecting the link.

13. The at least one non-transitory computer-readable storage medium of claim 12, wherein the operations further comprise:
maintaining display of the first web page on the mobile terminal while outputting the audio signal.

14. The at least one non-transitory computer-readable storage medium of 12, wherein the operations further comprise:
receiving user input navigating to a third web page while outputting the audio signal, the third web page being different than the first web page and the second web page; and
displaying the third web page on the mobile terminal while continuing to output the audio signal.

15. The at least one non-transitory computer-readable storage medium of claim 14, wherein the operations further comprise:
receiving user input to return to the electronic interface having the link to the second web page; and
in response to receiving the user input to return to the electronic interface having the link to the second web page, shifting the electronic interface to show the first web page that includes text data and the link to the second web page.

* * * * *